(12) United States Patent
Onggosanusi et al.

(10) Patent No.: US 10,887,884 B2
(45) Date of Patent: Jan. 5, 2021

(54) METHOD AND APPARATUS FOR SIGNALING IN SUPPORT OF UPLINK MULTI-BEAM OPERATION

(71) Applicant: Samsung Electronics Co., Ltd., Suwon-si (KR)

(72) Inventors: Eko Onggosanusi, Coppell, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/570,693

(22) Filed: Sep. 13, 2019

(65) Prior Publication Data

US 2020/0100232 A1 Mar. 26, 2020

Related U.S. Application Data

(60) Provisional application No. 62/734,320, filed on Sep. 21, 2018, provisional application No. 62/738,002, (Continued)

(51) Int. Cl.
*H04W 72/04* (2009.01)
*H04W 72/12* (2009.01)
*H04W 72/14* (2009.01)

(52) U.S. Cl.
CPC ....... *H04W 72/046* (2013.01); *H04W 72/042* (2013.01); *H04W 72/1284* (2013.01); *H04W 72/14* (2013.01)

(58) Field of Classification Search
CPC ............. H04W 74/042; H04W 72/046; H04W 72/1268; H04W 16/28; H04W 56/001;
(Continued)

(56) References Cited

U.S. PATENT DOCUMENTS

2018/0212651 A1* 7/2018 Li .................. H04B 7/0695
2018/0219606 A1 8/2018 Ng et al.
(Continued)

FOREIGN PATENT DOCUMENTS

WO 2018128365 A1 7/2018

OTHER PUBLICATIONS

3rd Generation Partnership Project; Technical Specification Group Radio Access Network; Evolved Universal Terrestrial Radio Access (E-UTRA); Physical channels and modulation (Release 14), 3GPP TS 36.211 V14.0.0, Sep. 2016, 170 pages.
(Continued)

*Primary Examiner* — Khanh C Tran

(57) ABSTRACT

Methods and apparatuses for uplink multi-beam operation. A method for operating a user equipment (UE) includes receiving, from a base station, an aperiodic reference signal (RS) trigger and, at a later time instant, an uplink (UL) beam indication. The method further includes decoding the aperiodic RS trigger and decoding the UL beam indication. The method includes determining, from the UL beam indication, a transmit spatial filter applied to a signal to be transmitted on a physical uplink shared channel (PUSCH) or a physical uplink control channel (PUCCH) and transmitting, to the base station, the signal on the PUSCH or the PUCCH. The transmit spatial filter corresponds to a reference RS. The UL beam indication includes a state of a transmit configuration associated with the reference RS.

20 Claims, 10 Drawing Sheets

Related U.S. Application Data filed on Sep. 28, 2018, provisional application No. 62/752,737, filed on Oct. 30, 2018, provisional application No. 62/753,221, filed on Oct. 31, 2018, provisional application No. 62/770,217, filed on Nov. 21, 2018, provisional application No. 62/881,676, filed on Aug. 1, 2019, provisional application No. 62/881,698, filed on Aug. 1, 2019.

(58) Field of Classification Search
CPC ............ H04W 72/1284; H04W 72/14; H04W 74/0833; H04W 24/10; H04W 52/262; H04W 72/02; H04W 72/085; H04W 72/1289; H04W 74/0866
See application file for complete search history.

(56) References Cited

U.S. PATENT DOCUMENTS

| | | | |
|---|---|---|---|
| 2018/0234959 A1 | 8/2018 | Ahn et al. | |
| 2018/0368142 A1* | 12/2018 | Liou | H04W 16/14 |
| 2019/0068263 A1* | 2/2019 | Yu | H04B 7/0686 |
| 2019/0103908 A1* | 4/2019 | Yu | H04B 7/0851 |
| 2019/0281588 A1* | 9/2019 | Zhang | H04L 5/0051 |
| 2019/0306909 A1* | 10/2019 | Zhou | H04B 7/08 |
| 2019/0327060 A1* | 10/2019 | Liu | H04B 7/0695 |
| 2019/0335477 A1* | 10/2019 | Nam | H04W 72/046 |

OTHER PUBLICATIONS

3rd Generation Partnership Project; Technical Specification Group Radio Access Network; Evolved Universal Terrestrial Radio Access (E-UTRA); Multiplexing and channel coding (Release 14), 3GPP TS 36.212 V14.0.0, Sep. 2016, 148 pages.
3rd Generation Partnership Project; Technical Specification Group Radio Access Network; Evolved Universal Terrestrial Radio Access (E-UTRA); Physical layer procedures (Release 14), 3GPP TS 36.213 V14.0.0, Sep. 2016, 406 pages.
3rd Generation Partnership Project; Technical Specification Group Radio Access Network; Evolved Universal Terrestrial Radio Access (E-UTRA); Medium Access Control (MAC) protocol specification (Release 14), 3GPP TS 36.321 V14.0.0, Sep. 2016, 96 pages.
3rd Generation Partnership Project; Technical Specification Group Radio Access Network; Evolved Universal Terrestrial Radio Access (E-UTRA); Radio Resource Control (RRC); Protocol specification (Release 14), 3GPP TS 36.331 V14.0.0, Sep. 2016, 644 pages.
3rd Generation Partnership Project; Technical Specification Group Radio Access Network; NR; Physical channels and modulation (Release 15), 3GPP TS 38.211 V15.0.0, Dec. 2017, 73 pages.
3rd Generation Partnership Project; Technical Specification Group Radio Access Network; NR; Multiplexing and channel coding (Release 15), 3GPP TS 38.212 V15.0.0, Dec. 2017, 82 pages.
3rd Generation Partnership Project; Technical Specification Group Radio Access Network; NR; Physical layer procedures (Release 15), 3GPP TS 38.213 V15.0.0, Dec. 2017, 56 pages.
3rd Generation Partnership Project; Technical Specification Group Radio Access Network; NR; Physical layer procedures for data (Release 15), 3GPP TS 38.214 V15.0.0, Dec. 2017, 71 pages.
3rd Generation Partnership Project; Technical Specification Group Radio Access Network; NR; Medium Access Control (MAC) protocol specification (Release 15), 3GPP TS 38.321 V15.0.0, Dec. 2017, 55 pages.
3rd Generation Partnership Project; Technical Specification Group Radio Access Network; NR; Radio Resource Control (RRC) protocol specification (Release 15), 3GPP TS 38.331 V15.0.0, Dec. 2017, 188 pages.
3rd Generation Partnership Project; Technical Specification Group Radio Access Network; NR; Physical layer measurements (Release 15), 3GPP TS 38.215 V15.0.0, Dec. 2017, 13 pages.
ISA/KR, International Search Report and Written Opinion of the International Searching Authority, International Application No. PCT/KR2019/012258, Jan. 6, 2020, 9 pages.
Samsung, "Remaining Issues on Multi-Beam Operation," R1-1808750, 3GPP TSG RAN WG1 Meeting #94, Gothenburg, Sweden, Aug. 20-24, 2018, 7 pages.
ZTE, "Enhancements on multi-beam operation," R1-1808199, 3GPP TSG RAN WG1 Meeting #94, Gothenburg, Sweden, Aug. 20-24, 2018, 5 pages.

\* cited by examiner

METHOD AND APPARATUS FOR SIGNALING IN SUPPORT OF UPLINK MULTI-BEAM OPERATION

CROSS-REFERENCE TO RELATED APPLICATIONS AND CLAIM OF PRIORITY

This application claims priority to:
U.S. Provisional Patent Application No. 62/734,320 filed Sep. 21, 2018;
U.S. Provisional Patent Application No. 62/738,002 filed Sep. 28, 2018;
U.S. Provisional Patent Application No. 62/752,737 filed Oct. 30, 2018;
U.S. Provisional Patent Application No. 62/753,221 filed Oct. 31, 2018;
U.S. Provisional Patent Application No. 62/770,217 filed Nov. 21, 2018;
U.S. Provisional Patent Application No. 62/881,676 filed Aug. 1, 2019; and
U.S. Provisional Patent Application No. 62/881,698 filed Aug. 1, 2019.
The above-identified provisional patent applications are hereby incorporated by reference in their entirety.

TECHNICAL FIELD

The present disclosure relates generally to methods for wireless communication systems and, more specifically, transmitting and receiving uplink beam indication for multi-beam operation.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two-dimensional array transmit antennas or, in general, antenna array geometry which accommodates a large number of antenna elements.

SUMMARY

Various embodiments of the present disclosure provide methods and apparatuses for uplink multi-beam operation.

In one embodiment, a user equipment (UE) is provided. The UE includes a transceiver and a processor operably connected to the transceiver. The transceiver is configured to receive, from a base station (BS), an aperiodic reference signal (RS) trigger and, at a later time instant, an uplink (UL) beam indication. The processor is configured to decode the aperiodic RS trigger; decode the UL beam indication; and determine, from the UL beam indication, a transmit spatial filter applied to a signal to be transmitted on a physical uplink shared channel (PUSCH) or a physical uplink control channel (PUCCH). The transceiver is further configured to transmit, to the base station, the signal on the PUSCH or the PUCCH. The transmit spatial filter corresponds to a reference RS. The UL beam indication includes a state of a transmit configuration associated with the reference RS.

In another embodiment, a base station (BS) is provided. The BS includes a processor and a transceiver operably connected to the processor. The processor is configured to generate an aperiodic RS trigger and an UL beam indication. The transceiver is configured to transmit, to a UE, the aperiodic RS trigger and, at a later time instant, the UL beam indication; and receive, from the UE, a signal on a physical uplink shared channel PUSCH or a PUCCH. The UL beam indication includes a state of a transmit configuration associated with a transmit spatial filter that corresponds to a reference RS.

In yet another embodiment, a method for operating a UE is provided. The method includes receiving from a base station, an aperiodic RS trigger and, at a later time instant, an UL beam indication. The method further includes decoding the aperiodic RS trigger and decoding the UL beam indication. The method includes determining, from the UL beam indication, a transmit spatial filter applied to a signal to be transmitted on a PUSCH or a PUCCH and transmitting, to the base station, the signal on the PUSCH or the PUCCH. The transmit spatial filter corresponds to a reference RS. The UL beam indication includes a state of a transmit configuration associated with the reference RS.

The present disclosure relates to a pre-5th-Generation (5G) or 5G communication system to be provided for supporting higher data rates Beyond 4th-Generation (4G) communication system such as Long-Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
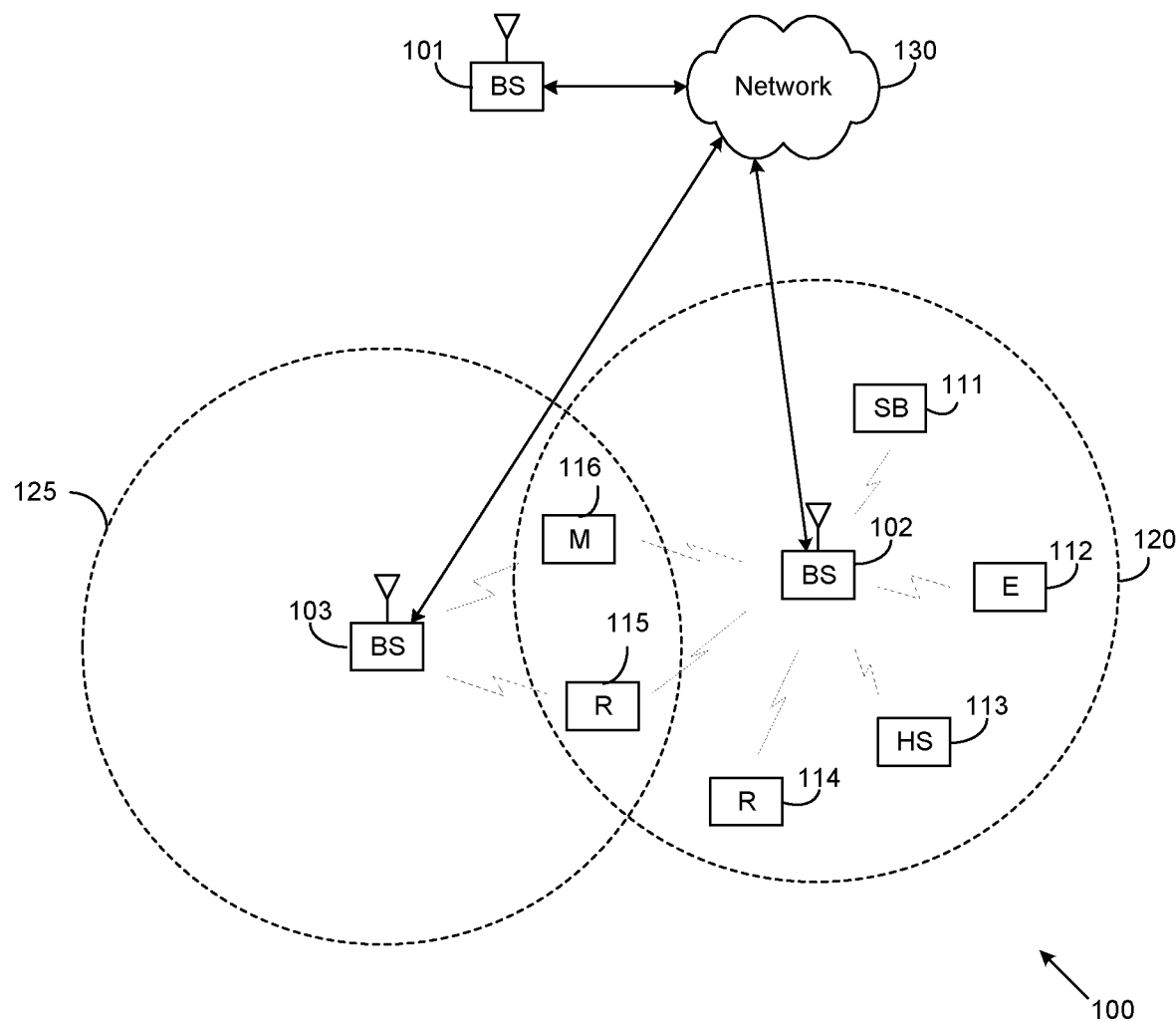
FIG. 1 illustrates an example wireless network according to various embodiments of the present disclosure.

FIGS. 1 through 12, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

LIST OF ACRONYMS

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); 3GPP TS 36.331 version 12.4.0, "E-UTRA, Radio Resource Control (RRC) Protocol Specification" ("REF 5"); 3GPP Technical Specification (TS) 38.211 version 15.0.0, "NR, Physical channels and modulation" ("REF 6"); 3GPP TS 38.212 version 15.0.0, "NR, Multiplexing and Channel coding" ("REF 7"); 3GPP TS 38.213 version 15.0.0, "NR, Physical Layer Procedures for Control" ("REF 8"); 3GPP TS 38.214 version 15.0.0, "NR, Physical Layer Procedures for Data" ("REF 9"); 3GPP TS 38.321 version 15.0.0, "NR, Medium Access Control (MAC) Protocol Specification" ("REF 10"); 3GPP TS 38.331 version 15.0.0, "NR, Radio Resource Control (RRC) Protocol Specification" ("REF 11"); and 3GPP TS 38.215 version 15.0.0, "NR, Physical Layer Measurements" ("REF 12")".

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands or, in general, above 6 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmit UL beam indication information to UEs 111-116 and configure UEs 111-116 for measuring DL RS or transmitting UL as described in embodiments of the present disclosure. In various embodiments, one or more of UEs 111-116 receive UL beam indication information as described in embodiments of the present disclosure.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

Figure 2A:
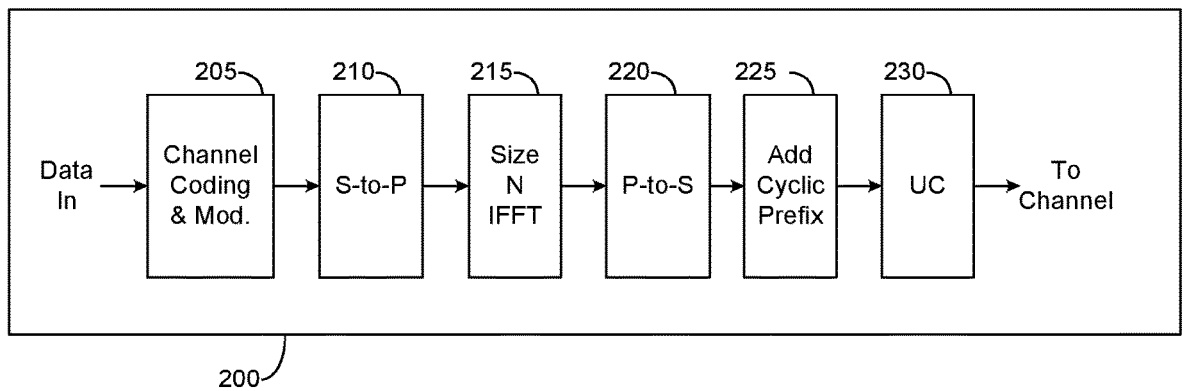
FIGS. 2A and 2B illustrate example wireless transmit and receive paths according to various embodiments of the present disclosure.
Figure 2B:
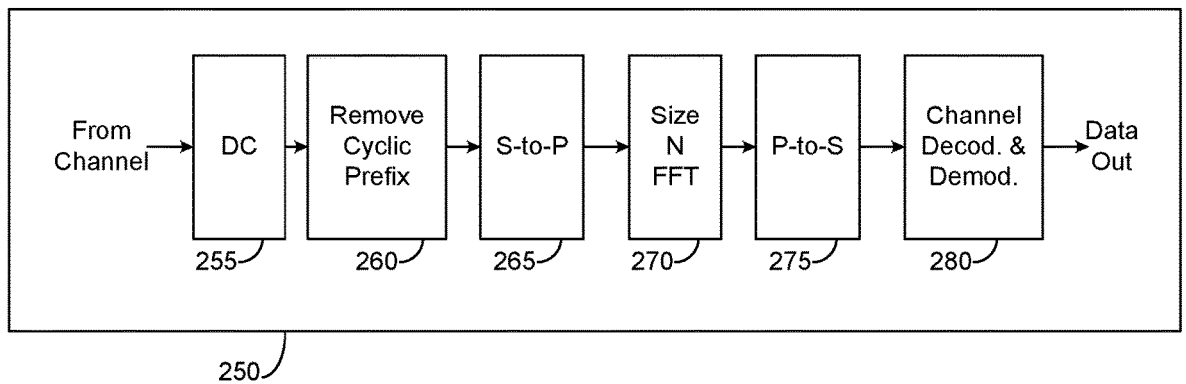

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 can be implemented in a gNB and that the transmit path 200 can be implemented in a UE. In some embodiments, the receive path 250 is configured to receive UL beam indication information as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the size N FFT block 270 and the size N IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B can be combined, further subdivided, or omitted and additional components can be added according to particular needs. FIGS. 2A and 2B are meant to illustrate examples of the types of transmit and receive paths that can be used in a wireless network. Other suitable architectures can be used to support wireless communications in a wireless network.

Figure 3A:
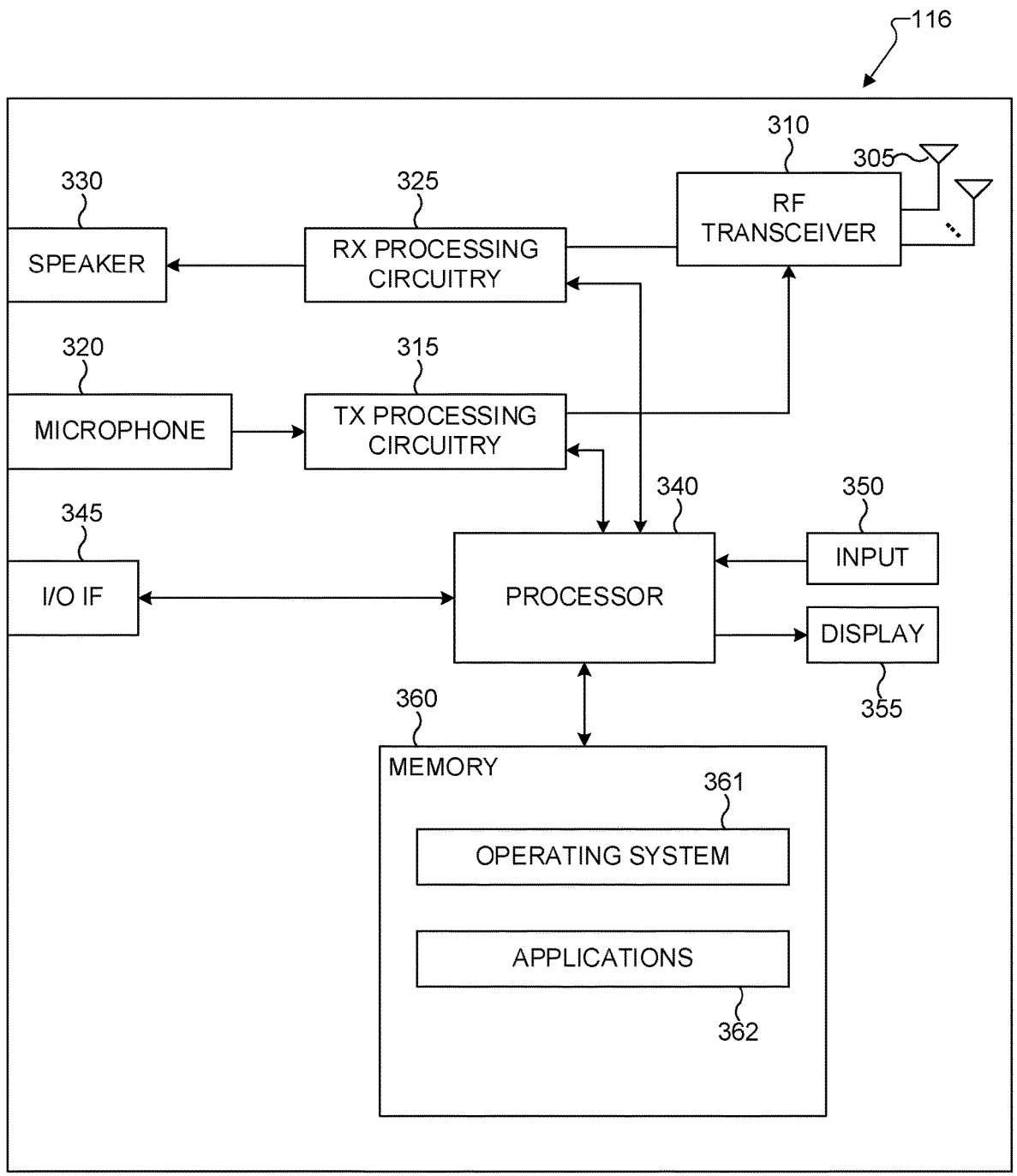
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for CSI-RS reception and measurement for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random-access memory (RAM), Flash memory, or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A can be combined, further subdivided, or omitted and additional components can be added according to particular needs. As a particular example, the processor 340 can be divided into multiple processors, such as one or more central processing units (CPUs) and one or more graphics processing units (GPUs). Although FIG. 3A illustrates the UE 116 as a mobile telephone or smartphone, UEs can be configured to operate as other types of mobile or stationary devices.

Figure 3B:
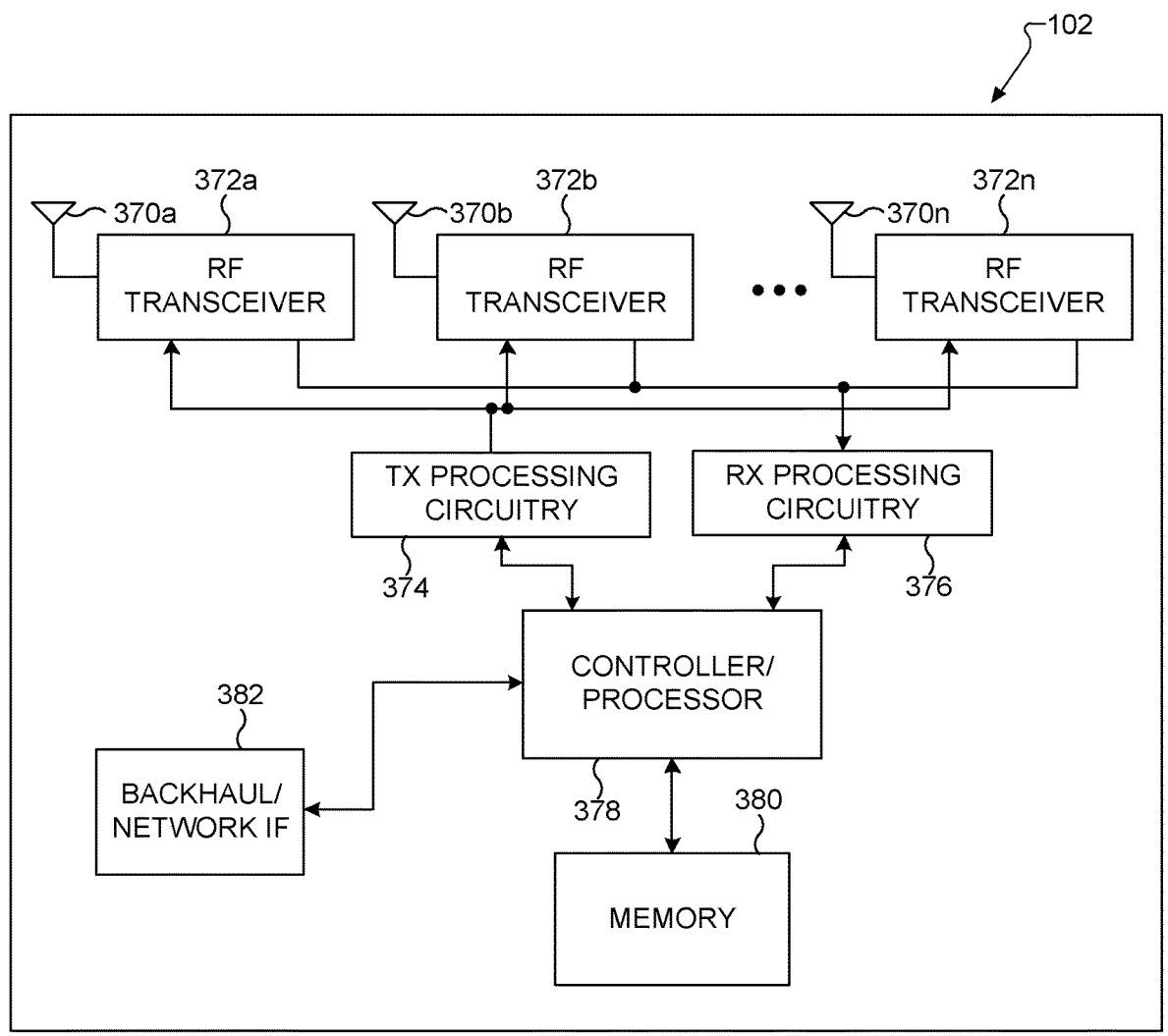
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/processor 378 includes at least one microprocessor or microcontroller.

The controller/processor 378 can execute programs and other processes resident in the memory 380, such as an OS. The controller/processor 378 can support channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions, such as a BIS algorithm, is stored in memory. The plurality of instructions, when executed, can cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) transmits UL beam indication information to a UE.

Although FIG. 3B illustrates one example of a gNB 102, various changes can be made to FIG. 3B. For example, the gNB 102 can include any number of each component shown in FIG. 3A. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE. For next generation cellular systems such as 5G, it is expected that the maximum number of CSI-RS ports remain more or less the same.

Figure 4:
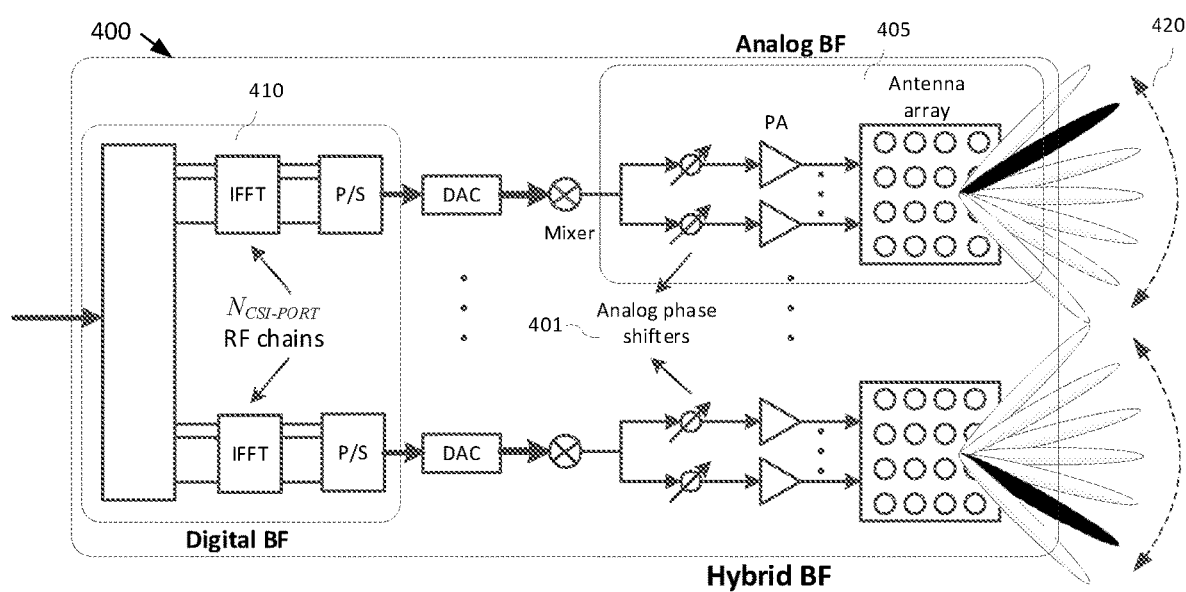
FIG. 4 illustrates an example beamforming architecture for a transmitter wherein one CSI-RS port is mapped onto a large number of analog-controlled antenna elements according to various embodiments of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated by transmitter 400 of FIG. 4. For example, this transmitter may be present in the gNB 102 or the UE 116 of FIG. 1. The embodiment of the transmitter 400 shown in FIG. 4 is for illustration only, and other transmitters can have the same or similar configuration.

In the embodiment illustrated in FIG. 4, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols and/or can comprise a transmission time interval). The number of sub-arrays (equal to the number of RF chains) is the same as the number of CSI-RS ports $N_{CSI\text{-}PORT}$. A digital beamforming unit 410 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

In Rel.15 NR, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

For UL multi-beam operation where a UE is equipped with a plurality of panels (each panel is able to transmit via one analog beam), using the same UL TX beam (or UL transmit spatial filter) for the panels is sub-optimal for at least two reasons. First, at best, only diversity-type transmission can be supported since using the same TX beam for multiple panels will most likely result in a low-rank (rank-one, in particular) channel. Second, the nature of mmWave propagating channel (also termed the FR2 in 3GPP) allows different blocking profiles for different panels. Since blocking results in no propagation, any transmission from a "blocked" panel is wasteful. Therefore, an UL beam indication for multiple TX beams is beneficial for UEs with multiple panels.

In addition, it is desirable to minimize the need for frequent RRC (L3) reconfiguration in multi-beam operation. This is because multi-beam operation is intended to circumvent higher-layer (L3) procedures such as mobility. In general, procedures that result in lower latency and, preferably, lower overhead, will be beneficial.

Therefore, there is a need for UL beam indication methods that can reap the potential benefits from UEs with multiple antenna panels. There is also a need for reducing latency and/or overhead for such methods.

In the following, for brevity, both FDD and TDD are considered as the duplex method for both DL and UL signaling.

Although example descriptions and embodiments to follow assume orthogonal frequency division multiplexing (OFDM) or orthogonal frequency division multiple access (OFDMA), embodiments of the present disclosure can be extended to other OFDM-based transmission waveforms or multiple access schemes such as filtered OFDM (F-OFDM).

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

Terminology such as UL TX beam is used for illustrative purposes and therefore not normative. Other terms such as UL transmit spatial filter, referring to a spatial filtering operation applied by the UE on a transmitted UL signal, can also be used to represent the same functions.

A "reference RS" corresponds to a set of characteristics of UL TX beam (or UL transmit spatial filter), such as direction, precoding/beamforming, number of ports, etc. For instance, as the UE receives a reference RS index/ID in an UL grant, the UE applies the known characteristics of the reference RS to the granted UL transmission. The reference RS can be received and measured by the UE (in this case, the reference RS is a downlink signal such as NZP CSI-RS and/or SSB) with the result of the measurement used for calculating a beam report. As the NW/gNB receives the beam report, the NW can be better equipped with information to assign a particular UL TX beam to the UE. Optionally, the reference RS can be transmitted by the UE (in this case, the reference RS is a downlink signal such as SRS or DMRS). As the NW/gNB receives the reference RS, the NW/gNB can measure and calculate the needed information to assign a particular UL TX beam to the UE.

The reference RS can be dynamically triggered by the NW/gNB (e.g. via DCI in case of aperiodic RS), preconfigured with a certain time-domain behavior (such as periodicity and offset, in case of periodic RS), or a combination of such pre-configuration and activation/deactivation (in case of semi-persistent RS).

The following two embodiments are examples of UL multi-beam operations that utilize UL beam indication after the network (NW) receives some transmission from the UE. In the first example embodiment, aperiodic CSI-RS is transmitted by the NW and measured by the UE. This embodiment can be used, for instance, when reciprocity between the UL and DL beam-pair-link (BPL) holds. This condition is termed "UL-DL beam correspondence." In the second example embodiment, aperiodic SRS is triggered by the NW and transmitted by the UE so that the NW (or a gNB) can measure the UL channel quality for the purpose of assigning an UL beam. This embodiment can be used whether UL-DL beam correspondence holds or not. Although aperiodic RS is used in these two examples, periodic or semi-persistent RS can also be used.

For mmWave (or FR2) or above 52.6 GHz (or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for the configured reference RSs (either per reference RS or "beam sweeping") and determine the TX-RX beam pairs associated with the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on the TX-RX beam pairs.

Figure 5:
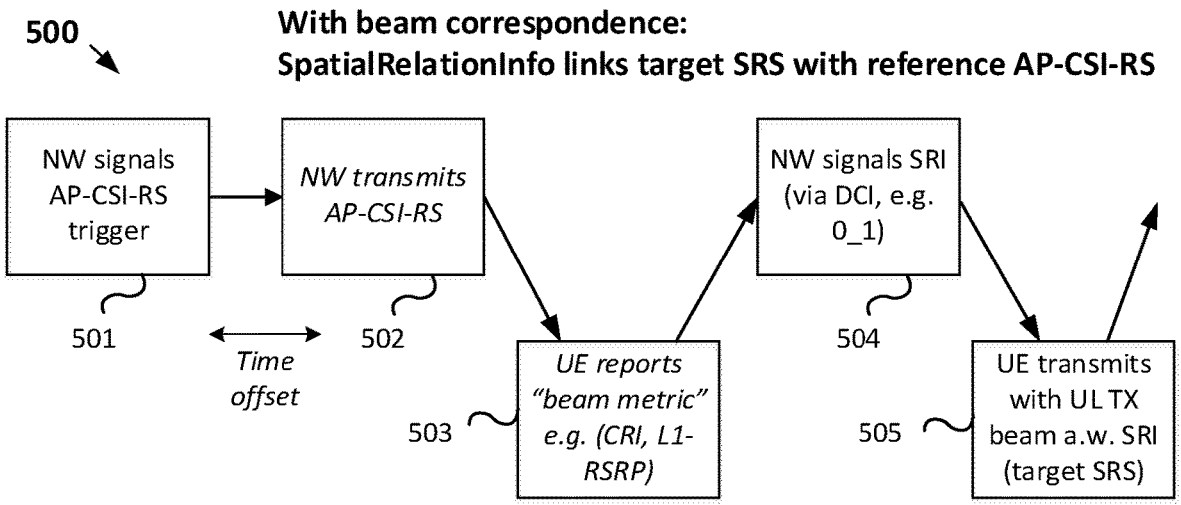
FIG. 5 illustrates a flow diagram for UL beam indication with SRI according to one or more embodiments of the present disclosure.

FIG. 5 illustrates a flow diagram 500 for UL beam indication with SRI according to one or more embodiments of the present disclosure. For example, the UL beam indication may be performed by a network element such as the gNB 102 to a UE, such as UE 116. The embodiment of the flow diagram 500 shown in FIG. 5 is for illustration only.

In the example illustrated in diagram 500 of FIG. 5, an UL multi-beam operation starts with the gNB/NW signaling to a UE an aperiodic CSI-RS (AP-CSI-RS) trigger or indication (step 501). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 502), the UE measures the AP-CSI-RS and, in turn, calculates and reports a "beam metric" (indicating quality of a particular TX beam hypothesis) (step 503). Examples of such beam reporting are CSI-RS resource indicator (CRI) or SSB resource indicator (SSB-RI) coupled with its associated L1-RSRP/L1-RSRQ/L1-SINR/CQI. Upon receiving the beam report from the UE, the NW can use the beam report to select an UL TX beam for the UE and indicate the UL TX beam selection (step 504) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH and/or UCI transmission on PUSCH or PUCCH) with the UL TX beam associated with the SRI (step 505).

Figure 6:
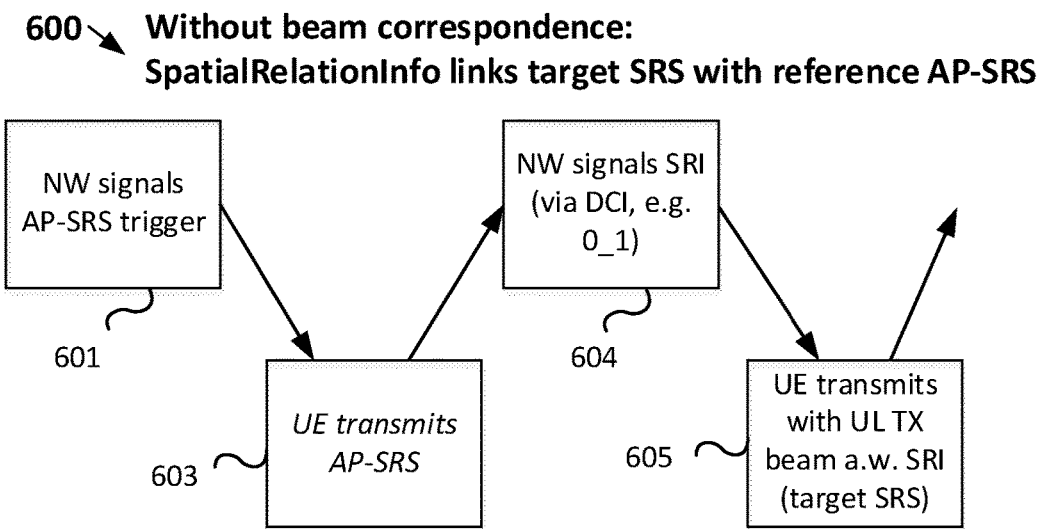
FIG. 6 illustrates a flow diagram for UL beam indication with SRI according to one or more embodiments of the present disclosure.

FIG. 6 illustrates a flow diagram 600 for UL beam indication with SRI according to one or more embodiments of the present disclosure. For example, the UL beam indication may be performed by a network element such as the gNB 102 to a UE, such as UE 116. The embodiment of the flow diagram 600 shown in FIG. 6 is for illustration only.

In another example illustrated in diagram 600 of FIG. 6, an UL multi-beam operation starts with the gNB/NW signaling to a UE an aperiodic SRS (AP-SRS) trigger or request (step 601). This trigger can be included in a DCI (either UL-related or DL-related). Upon receiving and decoding the AP-SRS trigger (step 602), the UE transmits AP-SRS to the gNB/NW (step 603) so that the NW (or gNB) can measure the UL propagation channel and select an UL TX beam for the UE. The gNB/NW can then indicate the UL TX beam selection (step 604) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH and/or UCI transmission on PUSCH or PUCCH) with the UL TX beam associated with the SRI (step 605).

In the above two example embodiments, only one UL TX beam is indicated to the UE. In the present disclosure, methods to improve the performance of UL multi-beam operation for multi-panel UEs are described.

Note that SRI is used in Rel.15 NR to correlate the direction to which the UL transmission is performed with a particular SRS resource (in terms of precoding/beamforming applied to the SRS resource). This SRS resource (termed the target SRS) is linked with a reference RS via higher-layer configuration (SpatialRelationInfo) that correlates (one-to-one) a set of (target) SRS resources with a set of reference RS. The characteristics of reference RS are learned (by the UE and/or the NW) via beam measurement and training. While the SRI-based method is viable, referencing directly to the set of reference RS is expected to provide better performance in term of latency reduction and unnecessary resource usage (such as the use of SRS resources for the "target" SRS).

For this purpose, methods that directly signal the reference RS to the UE can be used as described below. Here, a set of K reference RSs can be configured via higher-layer (such as RRC) signaling. The K reference RSs can be NZP CSI-RS, SSB, SRS, DMRS, or any combination of those. For example, this set can be composed of NZP CSI-RS and SSB. Or it can be composed of NZP CSI-RS only. Or it can be composed of NZP CSI-RS and SRS. Or it can be composed of SRS only. The reference RS can be associated with a resource ID of the particular type of RS. In addition, a set of $K_{TCI}$ ($\leq K$) UL transmission configuration information/indicator (UL-TCI) states can be configured either via higher-layer (RRC) signaling, or via L2 control signaling (MAC CE), or via L1 control signaling (DCI). As mentioned above, the term "TCI" or "UL-TCI" is used for illustrative purposes. The set of $K_{TCI}$ UL-TCI states can be selected from the configured set of K reference RSs and are used as the states for the UL-TCI field in the UL-related DCI.

The present disclosure includes, but is not limited to, the following components which can be used in conjunction or in combination with one another or can operate as stand-alone schemes. A first component includes UL TX beam indication methods without using SRI. A second component includes UL TX beam indication for UE equipped with multiple TX panels. A third component includes example methods for configuring UL TX beam indication for UEs equipped with multiple antenna panels. A fourth component includes example methods for dynamically signaling UL TX beam indication. The third and fourth components are applicable for both SRI-based and UL-TCI-based UL beam indication schemes.

Each of these components can be used either alone (without the other component) or in conjunction with at least one of the other components. Likewise, each of these components includes a plurality of sub-components. Each of the sub-components can be used either alone (without any other sub-component) or in conjunction with at least one of the other sub-components.

For the first component (that is, UL TX beam indication without using SRI), optional methods for signaling a single or multiple UL TX beams that do not use SRI are described. Note that SRI is used in Rel.15 to correlate the direction to which the UL transmission is performed with a particular SRS resource (in terms of precoding/beamforming applied to the SRS resource). This SRS resource (termed the target SRS) is linked with a reference RS via higher-layer configuration that correlates (one-to-one) a set of (target) SRS resources with a set of reference RS. The characteristics of reference RS are learned (by the UE and/or the NW) via beam measurement and training. While the SRI-based method is viable, referencing directly to the set of reference RS is expected to provide better performance in term of latency reduction and unnecessary resource usage (such as the use of SRS resources for the "target" SRS).

In one embodiment (I.1), a set of K reference RSs can be configured via higher-layer (such as RRC) signaling. The K reference RSs can be NZP CSI-RS, SSB, SRS, DMRS, or any combination of those. For example, this set can be composed of NZP CSI-RS and SSB. Or it can be composed of NZP CSI-RS only. Or it can be composed of NZP CSI-RS and SRS. Or it can be composed of SRS only. The reference RS can be associated with a resource ID of the particular type of RS. An example of such configuration is given in TABLE 1 where the reference RS set includes NZP CSI-RS and SRS, and K=8.

Observe that the configuration only includes the reference RS, without any target SRS. Therefore, SpatialRelationInfo that links target SRS with reference RS is not used, nor is it needed. A reference RS corresponds to a set of characteristics of UL TX beam, such as direction, precoding/beamforming, number of ports, etc. For instance, as the UE receives a reference RS index/ID in an UL grant, the UE applies the known characteristics of the reference RS to the granted UL transmission.

TABLE 1

Example of reference RS set, K = 8

| Reference RS index | Reference RS | |
|---|---|---|
| | Type | Resource ID for the type |
| 0 | NZP CSI-RS | 0 |
| 1 | NZP CSI-RS | 3 |
| 2 | NZP CSI-RS | 4 |
| 3 | NZP CSI-RS | 6 |
| 4 | SRS | 1 |
| 5 | SRS | 2 |
| 6 | SRS | 6 |
| 7 | SRS | 7 |

In one sub-embodiment (I.1.1), a set of $K_{TCI}$ ($\leq K$) UL transmission configuration information/indicator (UL-TCI) states can be configured via higher-layer (RRC) signaling. As mentioned above, the term "TCI" or "UL-TCI" is used for illustrative purposes. The set of $K_{TCI}$ UL-TCI states can be selected from the configured set of K reference RSs and are used as the states for the UL-TCI field in the UL-related DCI. TABLE 2A and 2B illustrate two examples of UL-TCI state configuration for the reference RS configuration given in TABLE 1 where UL-TCI index is set equal to reference RS index. In TABLE 2A, $K_{TCI}$=K=8 whereas in TABLE 2B, $K_{TCI}$=4 where only a subset of the K=8 reference RSs is utilized for UL-TCI.

TABLE 2A

Example $K_{TCI}$ = K = 8

| UL-TCI state index | Reference RS index |
|---|---|
| 0 | 0 |
| 1 | 1 |
| 2 | 2 |
| 3 | 3 |
| 4 | 4 |
| 5 | 5 |
| 6 | 6 |
| 7 | 7 |

TABLE 2B

Example $K_{TCI}$ = 4

| UL-TCI state index | Reference RS index |
|---|---|
| 0 | 0 |
| 1 | 1 |

TABLE 2B-continued

Example $K_{TCI} = 4$

| UL-TCI state index | Reference RS index |
|---|---|
| 2 | 5 |
| 3 | 6 |

For this sub-embodiment, with the set of $K_{TCI}$ UL-TCI states configured, an UL-TCI field can be used in UL-related DCI to indicate the UL TX beam selection to the UE. The number of hypotheses for the UL-TCI field is $K_{TCI}$, therefore $[\log_2(K_{TCI})]$bits can be used. In this case, UL-TCI is a separate DCI field. Optionally, the $K_{TCI}$ UL-TCI hypotheses can be jointly signaled and/or encoded in another DCI field.

In one sub-embodiment (I.1.2), a set of $K_{TCI}$ (≤K) UL transmission configuration information/indicator (UL-TCI) states can be configured dynamically, via L2 control signaling (such as MAC control element or MAC CE), or L1 control signaling (via DCI, UL-related and/or DL-related), or a combination between L2 and L1 control signaling. That is, the mapping between UL-DCI state index and reference RS index (e.g. TABLE 2A or 2B) is configured via L1 and/or L2 control signaling—instead of higher-layer/RRC/L3 signaling.

When L1 control signaling is used, a different RNTI can be used to differentiate this signaling from DL assignment and UL grant. Optionally, UE-group DCI (instead of UE-specific DCI) can be used since this mapping can be common across several UEs.

In one example, this sub-embodiment is used unconditionally. That is, the UE can be configured with a set of K reference RSs (example in TABLE 1) via higher-layer/RRC signaling while the $K_{TCI}$-subset selection along with the mapping between UL-DCI state index and reference RS index (e.g. TABLE 2A or 2B) is signaled via L1 and/or L2 control signaling.

In another example, this sub-embodiment is used only when a certain condition is fulfilled. An example of such condition is the value of $K_{TCI}$. For instance, if $K_{TCI}=K$, the mapping between UL-DCI state index and reference RS index is configured via higher-layer signaling (just as in sub-embodiment I.1.1). Otherwise (if $K_{TCI}<K$), the mapping between UL-DCI state index and reference RS index is configured via MAC CE (or DCI).

Just as the previous sub-embodiment I.1.1, with the set of $K_{TCI}$ UL-TCI states configured, an UL-TCI field can be used in UL-related DCI to indicate the UL TX beam selectin to the UE. The number of hypotheses for the UL-TCI field is $K_{TCI}$, therefore $[\log_2(K_{TCI})]$bits can be used. In this case, UL-TCI is a separate DCI field. Optionally, the $K_{TCI}$ UL-TCI hypotheses can be jointly signaled and/or encoded in another DCI field.

It is evident that in the above embodiments, there is no need for configuring target SRS resources. Since there is no need for allocating SRS resources for such purposes, the usage of SRS resources can be lessened with the UL-TCI-based beam indication methods.

For the above embodiments, as previously described, the UL-TCI DCI field can be included in an UL-related DCI. In 5G NR, this includes DCI format 0_0 and/or 0-1, and/or any other UL-related DCI formats for UL transmissions. In this case, at least two options can be implemented. In a first option, the UL-related DCI that includes the UL-TCI field can also include the SRI field (used for UL transmission such as the non-codebook-based UL transmission, not for UL beam indication). In a second option, the UL-related DCI that includes the UL-TCI field does not include the SRI field.

The following two sub-embodiments are examples of UL multi-beam operations that utilize UL-TCI-based UL beam indication. In the first example embodiment, aperiodic CSI-RS is transmitted by the NW and measured by the UE. This embodiment can be used, for instance, when reciprocity between the UL and DL beam-pair-link (BPL) holds. This condition is termed "UL-DL beam correspondence." In the second example embodiment, aperiodic SRS is triggered by the NW and transmitted by the UE so that the NW (or a gNB) can measure the UL channel quality for the purpose of assigning an UL beam. This embodiment can be used whether UL-DL beam correspondence holds or not. Although aperiodic RS is used in these two examples, periodic or semi-persistent RS can also be used.

Figure 7:
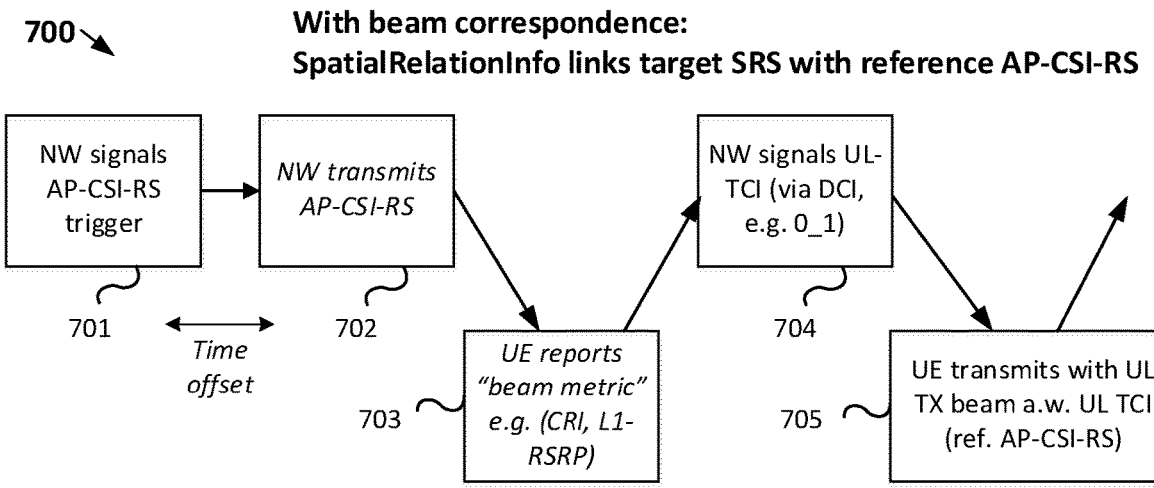
FIG. 7 illustrates a flow diagram for UL beam indication with UL TCI according to one or more embodiments of the present disclosure.

FIG. 7 illustrates a flow diagram 700 for UL beam indication with UL TCI according to one or more embodiments of the present disclosure. For example, the UL beam indication may be performed by a network element such as the gNB 102 to a UE, such as UE 116. The embodiment of the flow diagram 700 shown in FIG. 7 is for illustration only.

In one example illustrated in diagram 700 of FIG. 7 (sub-embodiment 1.2.1), an UL multi-beam operation starts with the gNB/NW signaling to a UE an aperiodic CSI-RS (AP-CSI-RS) trigger or indication (step 701). This trigger or indication can be included in a DCI (either UL-related or DL-related, either separately or jointly signaled with an aperiodic CSI request/trigger) and indicate transmission of AP-CSI-RS in a same (zero time offset) or later slot/subframe (>0 time offset). Upon receiving the AP-CSI-RS transmitted by the gNB/NW (step 702), the UE measures the AP-CSI-RS and, in turn, calculates and reports a "beam metric" (indicating quality of a particular TX beam hypothesis) (step 703). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB/NW can use the beam report to select an UL TX beam for the UE and indicate the UL TX beam selection (step 704) using the UL-TCI field in the UL-related DCI (that carries the UL grant, such as DCI format 0_1 in NR). In this case, the UL-TCI indicates a reference RS (in this case, an AP-CSI-RS) representing the selected UL RX beam (by the gNB/NW). Upon successfully decoding the UL-related DCI with the UL-TCI, the UE selects an UL TX beam and performs UL transmission (such as data transmission on PUSCH and/or UCI transmission on PUSCH or PUCCH) with the UL TX beam associated with the reference CSI-RS (step 805).

For this sub-embodiment (I.2.1), as described above, the UE selects the UL TX beam based on the derived DL RX beam associated with the reference RS index signaled via the UL-TCI field. In this case, the CSI-RS resources (or, in general, the DL RS resources including CSI-RS, SSB, or a combination of the two) configured for the UE as the reference RS resources can be linked to (associated with) "beam metric" reporting such as CRI/L1-RSRP or L1-SINR.

Figure 8:
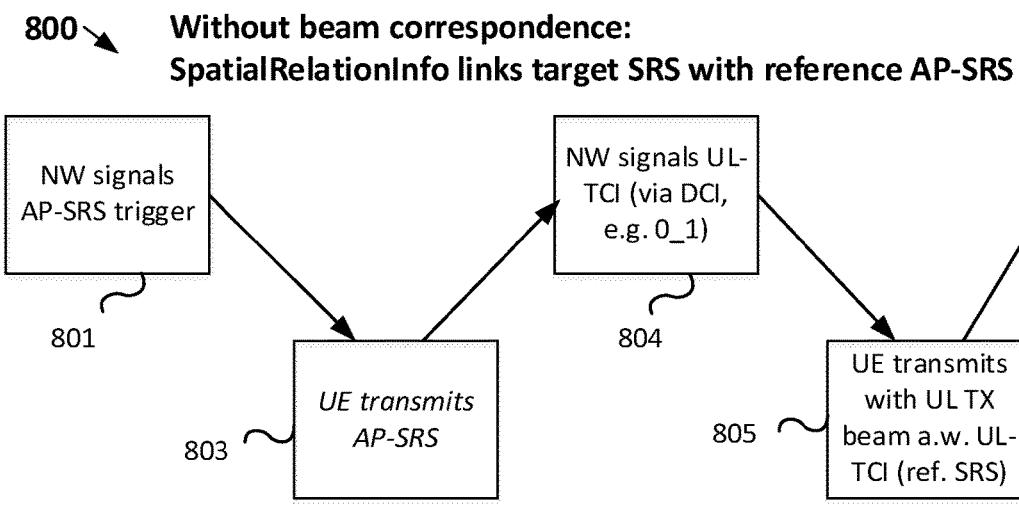
FIG. 8 illustrates a flow diagram for UL beam indication with UL TCI according to one or more embodiments of the present disclosure.

FIG. 8 illustrates a flow diagram 800 for UL beam indication with UL TCI according to one or more embodiments of the present disclosure. For example, the UL beam indication may be performed by a network element such as the gNB 102 to a UE, such as UE 116. The embodiment of the flow diagram 800 shown in FIG. 8 is for illustration only.

In another example illustrated in diagram 800 of FIG. 8 (sub-embodiment 1.2.2), an UL multi-beam operation starts with the gNB/NW signaling to a UE an aperiodic SRS (AP-SRS) trigger or request (step 801). This trigger can be included in a DCI (either UL-related or DL-related). Upon receiving and decoding the AP-SRS trigger (step 802), the UE transmits AP-SRS to the gNB/NW (step 803) so that the NW (or gNB) can measure the UL propagation channel and select an UL TX beam for the UE.

The gNB/NW can then indicate the UL TX beam selection (step 804) using the UL-TCI field in the UL-related DCI (that carries the UL grant, such as DCI format 0_1 in NR). In this case, the UL-TCI indicates a reference RS (in this case, an AP-SRS) representing the selected UL TX beam. Upon successfully decoding the UL-related DCI with the UL-TCI, the UE performs UL transmission (such as data transmission on PUSCH and/or UCI transmission on PUSCH or PUCCH) with the UL TX beam indicated by the UL-TCI (step 805).

For this sub-embodiment (1.2.2), as described above, the UE selects the UL TX beam from the reference RS (in this case SRS) index signaled via the UL-TCI field.

For the second component (that is, UL TX beam indication for multiple TX panels), for the above embodiments, the UE can be configured with at least one SRS resource can be configured for the purpose of sounding (hence UL CSI acquisition at the gNB, which can include UL TX beam training). This SRS resource configuration can be performed separately from the UL-TCI state configuration described above. If only one SRS resource is used, an SRI field is not needed. If more than one SRS resources are used (for example, in case of multi-panel UE with panel selection or simultaneous transmission across multiple panels), an SRI field (that indicates a selection of SRS resource) can be used. This SRI field can be defined separately or jointly with the UL-TCI field. For example, if a UE is configured with 2 SRS resources, TABLE 2A and 2B, for their purposes, can be extended as described in TABLE 3A and 3B to include the selection of SRS resource (that is, the function of SRI field included or jointly defined in the UL-TCI field).

Optionally, two UL-TCI fields and/or two SRI fields can be used for this purpose wherein the UL-TCI-based UL beam indication for the two panels can be done separately/independently. In this case, to accommodate the support for UE panel selection, a code-point for turning off a panel is included in each of the UL-TCI field.

TABLE 3A

Example $K_{TCI} = K = 8$

| UL-TCI state index | Reference RS index | SRS resource index |
|---|---|---|
| 0 | 0 | 0 |
| 1 | 1 | |
| 2 | 2 | |
| 3 | 3 | |
| 4 | 4 | |
| 5 | 5 | |
| 6 | 6 | |
| 7 | 7 | |
| 8 | 0 | 1 |
| 9 | 1 | |
| 10 | 2 | |
| 11 | 3 | |
| 12 | 4 | |
| 13 | 5 | |
| 14 | 6 | |
| 15 | 7 | |

TABLE 3B

Example $K_{TCI} = 4$

| UL-TCI state index | Reference RS index | SRS resource index |
|---|---|---|
| 0 | 0 | 0 |
| 1 | 1 | |
| 2 | 5 | |
| 3 | 6 | |
| 4 | 0 | 1 |
| 5 | 1 | |
| 6 | 5 | |
| 7 | 6 | |

Optionally, a UE can be configured with N≥1 SRS resources wherein each of the N SRS resources is linked to (associated with) a set of reference RS resources. That is, the n-th SRS resource is associated with the n-th reference RS resource set (n=0, 1, ..., N−1). This is illustrated in TABLE 4A (provided below) where each reference RS resource set includes $K_{TCI}$=4 reference RS resources with N=2. Here the two reference RS resource sets are different and share no common element(s). In general, while the two sets can be identical, they are in general different. Here the two reference RS resource sets can be used for two UE panels. The UL-TCI configuration in TABLE 4A, when co-configured with 2 SRS resources, can represent the so-called UE panel selection. In this case, only one of the two SRS resources is selected for each of the UL-TCI states.

If the N configured SRS resources are associated with the reference RS indices via higher-layer signaling, signaling the choice of SRS resource (e.g. using SRI field) just as in previous examples (illustrated in TABLE 3A and 3B) is not needed.

TABLE 4A can be extended as in TABLE 4B which illustrates another example wherein in addition to UE panel selection, simultaneous transmission across the two panels is also supported. In this example, one UL-TCI field is used for both panel selection and simultaneous transmission across the two panels. Optionally, two separate UL-TCI fields can be used wherein each UL-TCI field can be associated with one panel. This can be illustrated in TABLE 4C(a) and 4C(b) wherein the UL-TCI-based UL beam indication for the two panels can be done separately/independently. In this case, to accommodate the support for UE panel selection, a code-point for turning off a panel is included in each of the UL-TCI field.

TABLE 4A

Example $K_{TCI} = 4$ with N = 2, panel selection only

| UL-TCI state index | Reference RS index | SRS resource index |
|---|---|---|
| 0 | 0 | 0 |
| 1 | 1 | |
| 2 | 5 | |
| 3 | 6 | |
| 4 | 2 | 1 |
| 5 | 3 | |
| 6 | 4 | |
| 7 | 7 | |

TABLE 4B

Example $K_{TCI} = 4$ with N = 2

| UL-TCI state index | Reference RS index | SRS resource index |
|---|---|---|
| 0 | 0 | 0 |
| 1 | 1 | |

TABLE 4B-continued

Example $K_{TCI} = 4$ with $N = 2$

| UL-TCI state index | Reference RS index | SRS resource index |
|---|---|---|
| 2 | 5 | |
| 3 | 6 | |
| 4 | 2 | 1 |
| 5 | 3 | |
| 6 | 4 | |
| 7 | 7 | |
| 8 | (0, 2) | (0, 1) |
| 9 | (0, 4) | |
| 10 | (1, 3) | |
| 11 | (1, 7) | |
| 12 | (5, 2) | |
| 13 | (5, 4) | |
| 14 | (6, 3) | |
| 15 | (6, 7) | |

TABLE 4C

Example $K_{TCI} = 4$ with $N = 2$ (a)

| UL-TCI state index UL-TCI field 1 | Reference RS index | SRS resource index |
|---|---|---|
| 0 | 0 | 0 |
| 1 | 1 | |
| 2 | 5 | |
| 3 | 6 | |
| 4 | OFF (no transmission) | |

(b)

| UL-TCI state index UL-TCI field 2 | Reference RS index | SRS resource index |
|---|---|---|
| 0 | 2 | 1 |
| 1 | 3 | |
| 2 | 4 | |
| 3 | 7 | |
| 4 | OFF (no transmission) | |

For the above example embodiments and sub-embodiments in component 2, both UL beam indication (that is, reference RS index associated/QCL-ed with the UL TX beam) and panel selection (or panel subset selection) are included in the UL-TCI state definition and hence signaled jointly to the UE via the UL-TCI field in the UL-related DCI (e.g. TABLE 3A, 3B, 4A, or 4B). This is also performed implicitly when two UL-TCI fields are utilized for two panels (e.g. TABLE 4C). Therefore, both UL beam TX indication and panel subset selection are performed concurrently and can be updated at the same time via DCI-based signaling.

Optionally, instead of jointly defining and/or concurrently signaling/updating UL TX beam indication and panel subset selection, panel subset selection and UL TX beam indication can be performed separately. This accounts for the fact that the coupling between panel (subset) selection and UL TX beam indication is not necessary for numerous cases. For example, panel (subset) selection can remain the same for a longer period of time (to respond to long-term channel properties such as blocking or path loss, i.e. macroscopic channel properties) while UL TX beam indication (the TX spatial filter applied to the UL TX beam) can be updated more frequently (to respond to fast fading channel or microscopic channel properties). In this case, there are at least a few options as follows.

In a first option, two separate DCI fields for an UL-related DCI (derivative of or analogous to DCI format 0_0 and/or 0_1 in Rel.15/16 NR) can be used: one for panel subset selection associated with at least one SRI or SRS resource set indicator or other types of indicator comprising of some reference to SRS (or a group of SRS resources); the other for UL TX beam indication associated with at least one reference RS index/indicator. These two DCI fields can coexist (or concurrently included) and hence signaled to the UE in a same UL-related DCI. In this case, both are signaled and can be updated at the same time.

In a second option, two separate DCI fields for an UL-related DCI (derivative of or analogous to DCI format 0_0 and/or 0_1 in Rel.15/16 NR) can be used: one for panel subset selection associated with at least one SRI or SRS resource set indicator or other types of indicator comprising of some reference to SRS (or a group of SRS resources); the other for UL TX beam indication associated with at least one reference RS index/indicator. However, unlike the first option, those two DCI fields do not coexist in the same DCI. For example, the DCI field for panel subset selection can be included in a UE-group DCI while the DCI field for UL TX beam indication can be included in the UE-specific (dedicated) DCI derivative of or analogous to DCI format 0_0 and/or 0_1 in Rel.15/16 NR. Or conversely, the DCI field for UL TX beam indication can be included in a UE-group DCI while the DCI field for panel subset selection can be included in the UE-specific (dedicated) DCI derivative of or analogous to DCI format 0_0 and/or 0_1 in Rel.15/16 NR.

In a third option, panel subset selection associated with at least one SRI or SRS resource set indicator or other types of indicator comprising of some reference to SRS (or a group of SRS resources) is signaled to the UE via MAC CE (L2 control), while UL TX beam indication associated with at least one reference RS index/indicator is signaled via a DCI field in an UL-related DCI (derivative of or analogous to DCI format 0_0 and/or 0_1 in Rel.15/16 NR). Or conversely, UL TX beam indication associated with at least one reference RS index/indicator is signaled to the UE via MAC CE (L2 control), while panel subset selection associated with at least one SRI or SRS resource set indicator or other types of indicator comprising of some reference to SRS (or a group of SRS resources) is signaled via a DCI field in an UL-related DCI (derivative of or analogous to DCI format 0_0 and/or 0_1 in Rel.15/16 NR).

In a fourth option, panel subset selection associated with at least one SRI or SRS resource set indicator or other types of indicator comprising of some reference to SRS (or a group of SRS resources) is signaled to the UE via higher-layer (e.g. RRC) signaling, while UL TX beam indication associated with at least one reference RS index/indicator is signaled via a DCI field in an UL-related DCI (derivative of or analogous to DCI format 0_0 and/or 0_1 in Rel.15/16 NR). Or conversely, UL TX beam indication associated with at least one reference RS index/indicator is signaled to the UE via higher-layer (e.g. RRC) signaling, while panel subset selection associated with at least one SRI or SRS resource set indicator or other types of indicator comprising of some reference to SRS (or a group of SRS resources) is signaled via a DCI field in an UL-related DCI (derivative of or analogous to DCI format 0_0 and/or 0_1 in Rel.15/16 NR).

For at least the third or fourth options, the function signaled via UL-related DCI can be updated without changing the assignment of the other function. For example, with the third option where UL TX beam indication is signaled via UL-related DCI, UL TX beam indication (that is, the reference RS indicator) associated with the selected panel or panel subset can be updated without changing the selected panel or panel subset.

In regard of panel (subset) selection, the indication for the number of panels and the associated indices can be further partitioned.

For any of the above embodiments or sub-embodiments (for any of the components), the term UL-TCI field is used for illustrative purposes. Other terms and/or other DCI fields that are of a same functionality (that is, referring to at least one pre-configured UL TCI state) can be used and are therefore covered in the present disclosure. For instance, the function of the UL-TCI field can also be achieved by reusing the existing SRI field in DCI format 0_1 in Rel.15 NR. In this case, however, the SRI field is interpreted not according to the SpatialRelationInfo specified in Rel.15 NR, but the UL TCI state definition (that includes a list of reference RS resource IDs) described above. This SRI field can also be extended to accommodate more UL TCI hypotheses, either with one configured SRS resource or more than one configured SRS resources as described above.

For any of the above embodiments or sub-embodiments (for any of the components), SRI (which uniquely identifies a configured SRS resource) can be used to correspond to a UE transmission panel. Optionally, SRS resource set index/indicator can also be used to correspond to a UE transmission panel especially if one SRS resource comprises only one port (such as the case for non-codebook-based UL transmission scheme in Rel.15/16 NR). Optionally, an indicator distinct from SRI or SRS resource set indicator can be used to correspond to a UE transmission panel if slightly different (yet analogous) functionality is to be achieved. For example, if what constitutes a panel is not only a set of ports in a panel, but also a subset of ports within a panel or ports across multiple panels, a group or set (or port group or port set) indicator can be used. In this case, one group or set (of SRS ports or SRS resources) is associated with one UL transmission unit—which includes functionalities such as UL power control, UL timing (control or advance), and/or some type of QCL across the ports/resources within the group/set.

For any of the above embodiments or sub-embodiments (for any of the components), as previously described, a panel can be associated with either an SRS resource set or an SRS resource. For Rel.15/16 NR, since this depends on the transmission scheme, both associations are relevant and need to be accommodated. Therefore, an example scheme can be described as follows. For the purpose of panel subset selection, UL-TCI definition, and/or linkage (spatial relation or QCL) between reference RS and "target" SRS, a following condition can be used. If a UE is configured with codebook-based UL transmission, a group/set comprises at least one SRS resource. Else, if a UE is configured with non-codebook-based UL transmission, a group/set comprises at least one SRS resource set. In the example TABLE 3A to 4C, one SRS resource corresponds to one group (hence the group ID comprises SRI).

Applicable for the following third and fourth components, for illustrative purposes, the number of panels at the UE side is denoted as M. If a subset of the M panels is used, the number of the panels in the subset of denoted as N where N≤M. As described above, although one panel is an array of antenna elements driven by analog beamformer and hence able to generate a large number of possible directions, only one analog beam (which can be single- or dual-polarized) can be used for UL transmission and DL reception at a given time unit or sub-time unit (one or a fraction of a symbol, one or a fraction of a slot). Therefore, one panel, when transmitting or receiving with one analog beam, can accommodate only up to one stream/layer if the beam utilizes single polarization, or up to two streams/layers if the beam utilizes dual polarization.

For the third component (that is, configuring UL TX beam indication for multiple TX panels), the configuration for operating UL beam indication can include any of the following elements. First, an element for configuring M reference RS resource sets wherein one RS resource set can include one RS resource or more than one RS resources. Second, an element for selecting a subset (the size of N) of the M configured RS resource sets. Third, an element for configuring linkage or correspondence between the reference RS resources in a resource set and the information (dynamically) signaled to the UE via DCI.

In one embodiment (III.1), in regard of the first element, a UE can be configured with a total of M reference RS resource sets wherein a utilized reference RS can be either a DL RS (such as NZP CSI-RS, DL DMRS, or SSB) or an UL RS (such as SRS or UL DMRS). In terms of its use for multi-panel UEs, one reference RS resource set can correspond to one panel. For example, if NZP CSI-RS is the reference RS, M CSI-RS resource sets can be configured for the UE. If SRS is the reference RS, M SRS resource sets can be configured for the UE. This configuration can be signaled via higher-layer (such as RRC) signaling. For illustrative purposes, each resource set m (=0, 1, . . . , M−1) comprises $R_n$=R RS resources.

By using resource sets, the selection of reference RS resource can be partitioned across different resource sets (hence different panels).

In one embodiment (III.2), in regard of the second element, out of the M configured reference RS resource sets, a subset of size N can be selected for the purpose of UL transmission (on, e.g. PUSCH, PUCCH). This can be described as follows. For illustrative purposes, only one reference RS resource is selected out of R resources for each resource set. In this case, if N out of the M configured resource sets are further selected for UL transmission reference and only 1 SRS resource can be selected from one resource set, the number of $$\text{hypotheses} = \binom{M}{N} \times R$$

for a given value of N. If we total up the number of hypotheses across values of N (from 1 to M), the total number of hypotheses=$(2^M-1) \times R$.

This subset selection can be signaled to the UE in several optional manners. Note that it is possible to signal N and the corresponding subset (which resource set(s) are selected) either together or separately. Some of the options are given in TABLE 5. When DCI is used, it can be either UE-group (applicable when a group of UEs can share the same setup) or UE-specific DCI. In addition, the value of N and the content of size-N subset can be jointly signaled by using a size-M bitmap (where the m-th resource set corresponds to the m-th bit, and the m-th resource set is selected if the m-th bit is 1—therefore the number of 1's signifies the value of N) or an indicator (relevant if not the $$\binom{M}{N}$$

combinations are utilized).

TABLE 5

Signaling reference RS resource set selection

Information signaled via . . .

| Option | Value of N | The content of size-N subset |
|---|---|---|
| 1A | RRC | MAC CE |
| 1B | RRC | DCI |
| 2A | MAC CE, together or jointly signaled with the content of size-N subset | MAC CE |
| 2B | MAC CE | DCI |
| 3 | DCI, together or jointly signaled with the content of size-N subset | DCI |

This embodiment can be used unconditionally or conditionally. An example of a conditional use of the N-subset selection can be based on the value of N. For instance, if M and/or N are less than a certain value, the N-subset selection can be skipped. Otherwise, the N-subset selection is used.

In one embodiment (III.3), in regard of the third element, the M or N configured reference RS resource sets can be linked with a set of configured "target" SRS resources (via, e.g. higher layer/RRC signaling). This embodiment is relevant when SRI-based UL TX beam indication is used or configured. This linkage can be signaled via a configuration parameter such as the SpatialRelationInfo (this term is used for illustrative purposes, and other terms can also be used). The SpatialRelationInfo parameter can be configured either via higher-layer (RRC) signaling or L1 control signaling (DCI) or L2 control signaling (MAC CE).

In terms of the content or definition of the SpatialRelationInfo, a few sub-embodiments are possible.

In one sub-embodiment (III.3.1), per-panel (per reference RS resource set) SpatialRelationInfo can be used. Each configuration links one target SRS to one reference RS (which could be CSI-RS, SSB, or SRS) represented by an ID. If SpatialRelationInfo is signaled via higher-layer (RRC) signaling, a total of M (the total number of configured reference RS resource sets) SpatialRelationInfo configurations are used. If SpatialRelationInfo is signaled via L1 or L2 control signaling, there is no need to correlate the M reference RS resource sets with the M target SRS resources. Instead, only N (the number of selected reference RS resource sets) SpatialRelationInfo configurations are used. The N SpatialRelationInfo configurations can also be signaled together or jointly with the subset selection (cf. TABLE 5).

In another sub-embodiment (III.3.2), a joint (one for the reference RS resource sets) SpatialRelationInfo can be used. If SpatialRelationInfo is signaled via higher-layer (RRC) signaling, it links each reference RS resource (represented by an ID) in a reference RS resource set with a target SRS resource wherein the total number of reference RS resource sets is M. If SpatialRelationInfo is signaled via L1 or L2 control signaling, it links each reference RS resource in a reference RS resource set with a target SRS resource wherein the total number of reference RS resource sets is N.

In another embodiment (III.4), in regard of the third element, the M or N configured reference RS resource sets can be linked with a set of code-points/hypotheses of an UL-related DCI field that signals the reference RS resource to the UE. This embodiment is relevant when UL-TCI-based UL TX beam indication is used or configured. Therefore, there is no need for using target SRS. This linkage can be signaled via a configuration parameter such as the UL-TCI-State (this term is used for illustrative purposes, and other terms can also be used). The UL-TCI-State parameter can be configured either via higher-layer (RRC) signaling or L1 control signaling (DCI) or L2 control signaling (MAC CE).

In terms of the content or definition of the UL-TCI-State, a few sub-embodiments are possible.

In one sub-embodiment (III.4.1), per-panel (per reference RS resource set) UL-TCI-State can be used. Each configuration links one code-point of the UL-TCI field to one reference RS (which could be CSI-RS, SSB, or SRS) represented by an ID. If UL-TCI-State is signaled via higher-layer (RRC) signaling, a total of M (the total number of configured reference RS resource sets) UL-TCI-State configurations are used. If UL-TCI-State is signaled via L1 or L2 control signaling, there is no need to correlate the M reference RS resource sets with the M code-points of the UL-TCI field. Instead, only N (the number of selected reference RS resource sets) UL-TCI-State configurations are used. The N UL-TCI-State configurations can also be signaled together or jointly with the subset selection (cf. TABLE 5).

In another sub-embodiment (III.4.2), a joint (one for the reference RS resource sets) UL-TCI-State can be used. If UL-TCI-State is signaled via higher-layer (RRC) signaling, it links each reference RS resource (represented by an ID) in a reference RS resource set with a code-point of the UL-TCI field wherein the total number of reference RS resource sets is M. If UL-TCI-State is signaled via L1 or L2 control signaling, it links each reference RS resource in a reference RS resource set with a code-point of the UL-TCI field wherein the total number of reference RS resource sets is N.

Figure 9:
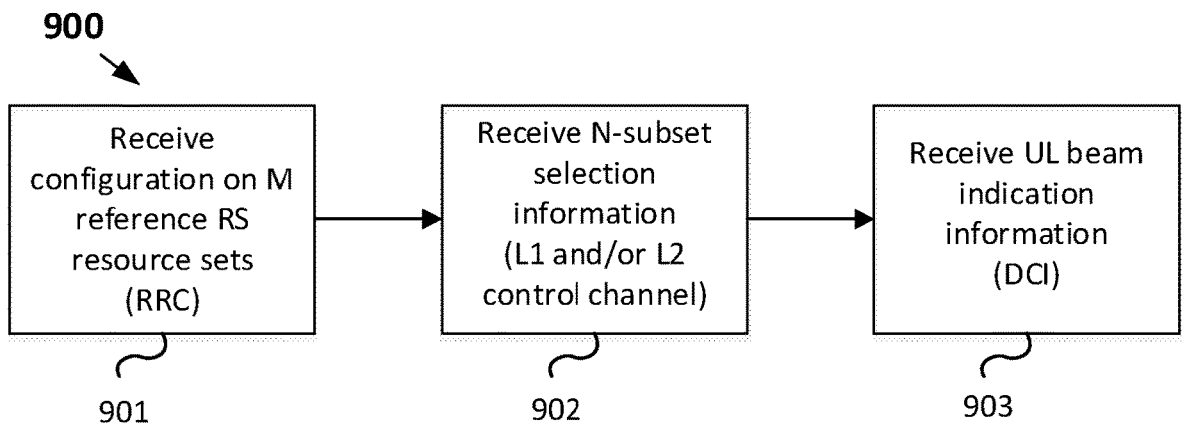
FIG. 9 illustrates a flow diagram for UL beam indication procedure for multiple panels according to one or more embodiments of the present disclosure.

FIG. 9 illustrates a flow diagram 900 for UL beam indication procedure for multiple panels according to one or more embodiments of the present disclosure. Some examples on a UE operation that utilizes these elements together can be illustrated in FIG. 9. This diagram 900 is intended for illustrative purposes. For instance, while the diagram 900 demonstrates a certain logical flow, it is by no means intended to be normative. Different implementations such as serial, parallel, or any combination thereof are not excluded. In diagram 900, the UE receives the configuration information on the M reference RS resource sets (step 901). This information is signaled via higher-layer (RRC) signaling. Once the UE receives this configuration, the UE can receive the N-subset selection information via L1 or L2 control signaling (step 902). This N-subset selection information can also be accompanied with either SpatialRelationInfo (if SRI-based solution is used) or UL-TCI-State (if UL-TCI-based solution is used). Based on this configuration information, when the UE receives an UL-related DCI addressed to it, the UE can receive and decode the UL TX beam indication, either from SRI or from TCI field, in the DCI (step 903).

In the above embodiments (III.1, III.2, III.3, and III.4) and their sub-embodiments, the UE is configured with M reference RS resource sets where M can correspond to the number of UE panels in implementation. This setup is particularly relevant when more than one reference RS resources are needed to perform a multi-layer MIMO transmission. In Rel.15 NR, this is the case for non-codebook-based UL transmission. However, for transmission schemes that require only one reference RS resource to perform a multi-layer MIMO transmission (such as the case for codebook-based UL transmission), instead of associating one reference RS resource set with one UE panel, a panel can be associated with one reference RS resource. In this case, there is no need for configuring a UE with M reference RS resource sets. Rather, the UE can be configured with M reference RS resources.

Using Rel.15 NR to illustrate this concept, for codebook-based UL transmission, a UE can be configured with up to 2 SRS resources with the maximum number of SRS resource sets of one. Each SRS resource can correspond to up to 4 ports (thereby supporting up to 4-layer transmission per SRS resource). In this case, since only one SRS resource is needed to perform an L-layer UL MIMO transmission, two SRS resources can be used to support 2 UE panels (one SRS resource is associated with one UE panel, each SRS resource capable of supporting multi-layer MIMO transmission). There is no need for configuring multiple SRS resource sets to support multiple UE panels. For non-codebook-based UL transmission, a UE can be configured with up to 4 SRS resources with the maximum number of SRS resources of one. Each SRS resource can correspond to only 1 port (thereby supporting 1-layer transmission per SRS resource). In this case, since multiple (L) SRS resources are needed to perform an L-layer UL MIMO transmission, two SRS resource sets can be used to support 2 UE panels (one SRS resource set is associated with one UE panel, each SRS resource set capable of supporting multi-layer MIMO transmission). Here, it is fitting to configure multiple SRS resource sets to support multiple UE panels.

Therefore, the above embodiments (III.1, III.2, III.3, and III.4) and their sub-embodiments admit the following variations: instead of configuring a UE with M reference RS resource sets, the UE is configured with M reference RS resources. The operations pertaining to resource sets can be performed on resources, such as the N-subset selection. The same applies with SpatialRelationInfo (for SRI-based UL beam indication) and/or UL-TCI-State (for UL-TCI-based UL beam indication) configuration.

Figure 10:
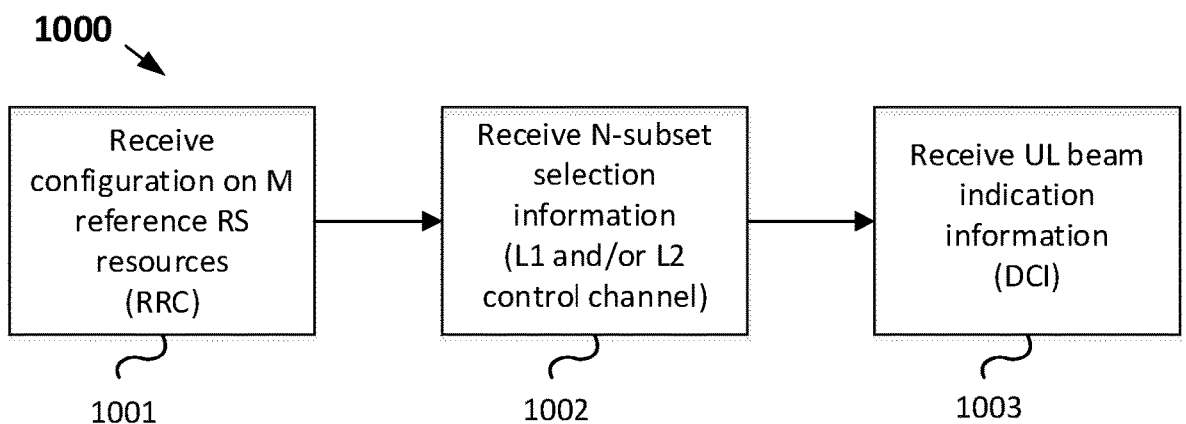
FIG. 10 illustrates a flow diagram for UL beam indication procedure for multiple panels according to one or more embodiments of the present disclosure.

FIG. 10 illustrates a flow diagram 1000 for UL beam indication procedure for multiple panels according to one or more embodiments of the present disclosure. Some examples on a UE operation that utilizes these elements together can be illustrated in FIG. 10. The diagram 1000 is intended for illustrative purposes. For instance, while the diagram 1000 demonstrates a certain logical flow, it is by no means intended to be normative. Different implementations such as serial, parallel, or any combination thereof are not excluded. In diagram 1000, the UE receives the configuration information on the M reference RS resources (step 1001). This information is signaled via higher-layer (RRC) signaling. Once the UE receives this configuration, the UE can receive the N-subset selection information via L1 or L2 control signaling (step 1002). This N-subset selection information can also be accompanied with either SpatialRelationInfo (if SRI-based solution is used) or UL-TCI-State (if UL-TCI-based solution is used). Based on this configuration information, when the UE receives an UL-related DCI addressed to it, the UE can receive and decode the UL TX beam indication, either from SRI or from TCI field, in the DCI (step 1003).

For the above embodiments, the UE can additionally be configured with at least M SRS resources (analogous to the "target" SRS resources) for the purpose of sounding (hence UL CSI acquisition at the gNB, which can include UL TX beam training, for each of the M panels). This SRS resource configuration can be performed separately from the UL-TCI state (or SpatialRelationInfo) configuration described above. This can be done to support, for instance, panel selection or simultaneous transmission across multiple panels. In this case, an SRI field (that indicates a selection of SRS resource) can be used. This (additional) SRI field can be defined separately or jointly with the UL-TCI field or the existing SRI field. Each of these M SRS resources can also be linked with the reference RS resources or resource sets.

For the fourth component (that is, dynamic signaling of UL TX beam indication), this dynamic signaling is used to signal the UE the assigned UL TX beam which is represented by either a target SRS resource ID (if SRI-based method is used) or the reference RS resource ID via L1 DL control channel, that is, UL-related DCIII. Therefore, a DCI field designated for UL TX beam indication is used—either SRI or UL-TCIII. To support multi-beam operation with multi-panel UEs, this DCI field can be designed to accommodate signaling in relation to one or multiple resource sets.

In one embodiment (IV.1) where SRI-based method is used, SRI is used to indicate the selection of target SRS resource. The SRI field in the UL-related DCI (such as DCI 0_1 in 5G NR) can be extended as follows.

In one sub-embodiment (IV.1.1), M SRIs can be used. Here, N-subset selection can also be performed together with the SRIII. In this case, one SRI hypothesis is "not selected/transmitted/used" of that particular SRS resource set.

In another sub-embodiment (IV.1.2), N SRIs can be used. Here, N-subset selection needs to be signaled a priori, I.e. before the UE receives the UL-related DCIII. In this case "not selected/transmitted/used" hypothesis is optional for each SRIII. As previously described, N can be higher-layer configured (via RRC), or signaled via MAC CE, or signaled via DCI prior to DCI 0_1 carrying the UL grant and SRI (for target SRS).

In another sub-embodiment (IV.1.3), an expanded X-bit SRI can be used wherein this SRI accommodates a subset of possible hypotheses comprising M or N SRS resource sets. This can be perceived as an aggregate SRI for the selected or configured target SRS resource sets.

In one embodiment (IV.2) where UL-TCI-based method is used, UL-TCI is used to indicate the selection of reference RS resource. The UL-TCI field in the UL-related DCI (such as DCI 0_1 in 5G NR) can be extended as follows.

In one sub-embodiment (IV.2.1), M UL-TCIs can be used. Here, N-subset selection can also be performed together with the UL-TCIII. In this case, one UL-TCI hypothesis is "not selected/transmitted/used" of that particular reference RS resource set.

In another sub-embodiment (IV.2.2), N UL-TCIs can be used. Here, N-subset selection needs to be signaled a priori, I.e. before the UE receives the UL-related DCIII. In this case "not selected/transmitted/used" hypothesis is optional for each UL-TCIII. As previously described, N can be higher-layer configured (via RRC), or signaled via MAC CE, or signaled via DCI prior to DCI 0_1 carrying the UL grant and UL-TCI (for the reference TRS resource).

In another sub-embodiment (IV.2.3), an expanded X-bit UL-TCI can be used wherein this UL-TCI accommodates a subset of possible hypotheses comprising M or N reference RS resource sets. This can be perceived as an aggregate UL-TCI for the selected or configured reference RS resource sets.

Just as for Component 4, in the above embodiments (IV.1 and IV.2) and their sub-embodiments, the UE is configured with M reference RS resource sets where M can correspond to the number of UE panels in implementation. This setup is particularly relevant when more than one reference RS resources are needed to perform a multi-layer MIMO transmission. In Rel.15 NR, this is the case for non-codebook-based UL transmission. However, for transmission schemes that require only one reference RS resource to perform a multi-layer MIMO transmission (such as the case for codebook-based UL transmission), instead of associating one reference RS resource set with one UE panel, a panel can be associated with one reference RS resource. In this case, there is no need for configuring a UE with M reference RS resource sets. Rather, the UE can be configured with M reference RS resources.

Therefore, the above embodiments (IV.1 and IV.2) and their sub-embodiments admit the following variations: instead of configuring a UE with M reference RS resource sets, the UE is configured with M reference RS resources. Operations pertaining to resource sets can be performed on resources, such as the N-subset selection. The same applies with SpatialRelationInfo (for SRI-based UL beam indication) and/or UL-TCI-State (for UL-TCI-based UL beam indication) configuration.

For any of the above embodiments or sub-embodiments (for any of the components), the term UL-TCI field is used for illustrative purposes. Other terms and/or other DCI fields that are of a same functionality (that is, referring to at least one pre-configured UL TCI state) can be used and are therefore covered in the present disclosure. For instance, the function of the UL-TCI field can also be achieved by reusing the existing SRI field in DCI format 0_1 in Rel.15 NR. In this case, however, the SRI field is interpreted not according to the SpatialRelationInfo specified in Rel.15 NR, but the UL TCI state definition (that includes a list of reference RS resource IDs) described above. This SRI field can also be extended to accommodate more UL TCI hypotheses, either with one configured SRS resource or more than one configured SRS resources as described above.

For any of the above embodiments or sub-embodiments (for any of the components), SRI (which uniquely identifies a configured SRS resource) can be used to correspond to a UE transmission panel. Optionally, SRS resource set index/indicator can also be used to correspond to a UE transmission panel especially if one SRS resource comprises only one port (such as the case for non-codebook-based UL transmission scheme in Rel.15/16 NR). Optionally, an indicator distinct from SRI or SRS resource set indicator can be used to correspond to a UE transmission panel if slightly different (yet analogous) functionality is to be achieved. For example, if what constitutes a panel is not only a set of ports in a panel, but also a subset of ports within a panel or ports across multiple panels, a group or set (or port group or port set) indicator can be used. In this case, one group or set (of SRS ports or SRS resources) is associated with one UL transmission unit—which includes functionalities such as UL power control, UL timing (control or advance), and/or some type of QCL across the ports/resources within the group/set.

For any of the above embodiments or sub-embodiments (for any of the components), as previously described, a panel can be associated with either an SRS resource set or an SRS resource. For Rel.15/16 NR, since this depends on the transmission scheme, both associations are relevant and need to be accommodated. Therefore, an example scheme can be described as follows. For the purpose of panel subset selection, UL-TCI definition, and/or linkage (spatial relation or QCL) between reference RS and "target" SRS, a following condition can be used. If a UE is configured with codebook-based UL transmission, a group/set comprises at least one SRS resource. Else, if a UE is configured with non-codebook-based UL transmission, a group/set comprises at least one SRS resource set.

Any of the above variation embodiments can be utilized independently or in combination with at least one other variation embodiment.

Figure 11:
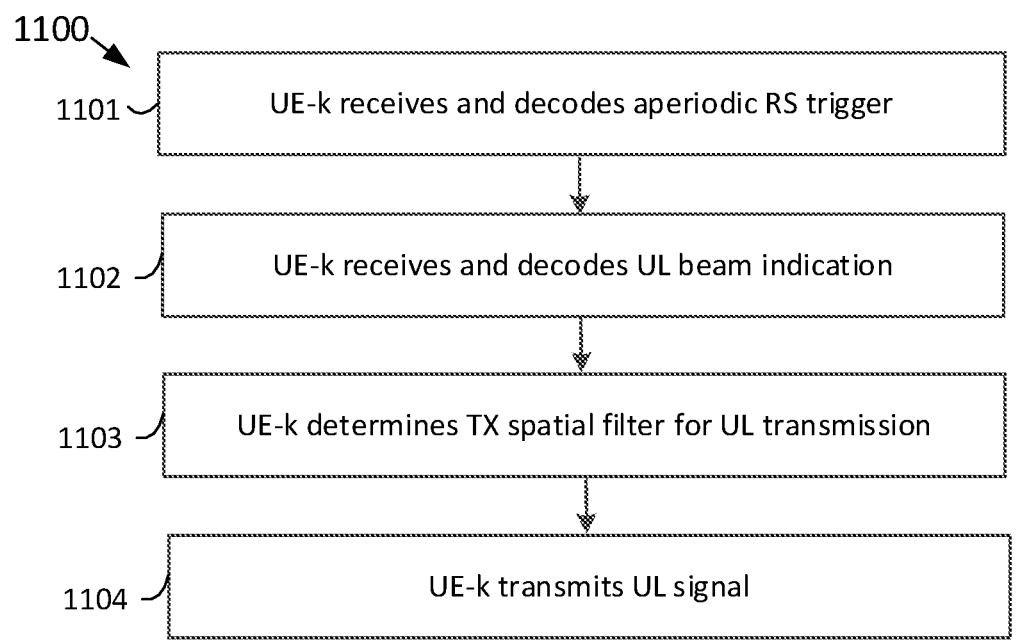
FIG. 11 illustrates a flowchart for an example method wherein a UE receives UL beam indication according to one or more embodiments of the present disclosure.

FIG. 11 illustrates a flowchart for an example method 1100 wherein a UE receives UL beam indication according to an embodiment of the present disclosure. For example, the method 1100 can be performed by the UE 116. The embodiment of the method 1100 shown in FIG. 11 is for illustration only.

The method 1100 begins with the UE receiving, from a base station, and decoding an aperiodic reference signal (RS) trigger (step 1101). At a later time-instant, the UE receives, from the same base station, and decodes an uplink (UL) beam indication (step 1102). This procedure is followed by the UE determining, from the UL beam indication, a transmit spatial filter applied to an uplink transmitted signal (step 1103). The transmit spatial filter corresponds to a reference RS and the UL beam indication includes a state of a transmit configuration associated with the reference RS. The reference RS is at least a Channel State Information RS (CSI-RS) or a Sounding RS (SRS). The UL beam indication can be included in an UL grant received on a Physical Downlink Control Channel (PDCCH). For instance, the UL beam indication can be signaled in an UL Transmit Configuration Information (TCI) field of an UL-related DCI. The uplink transmitted signal can be transmitted on a physical uplink shared channel (PUSCH) or a physical uplink control channel (PUCCH) (step 1104).

The triggered aperiodic RS can be a CSI-RS. In this case, between steps 1101 and 1102, the UE receives the aperiodic CSI-RS in response to the trigger and transmit a beam metric report (after measuring the aperiodic CSI-RS). Optionally, the triggered aperiodic RS is an SRS. In this case, between steps 1101 and 1102, the UE transmits the aperiodic SRS in response to the trigger.

Figure 12:
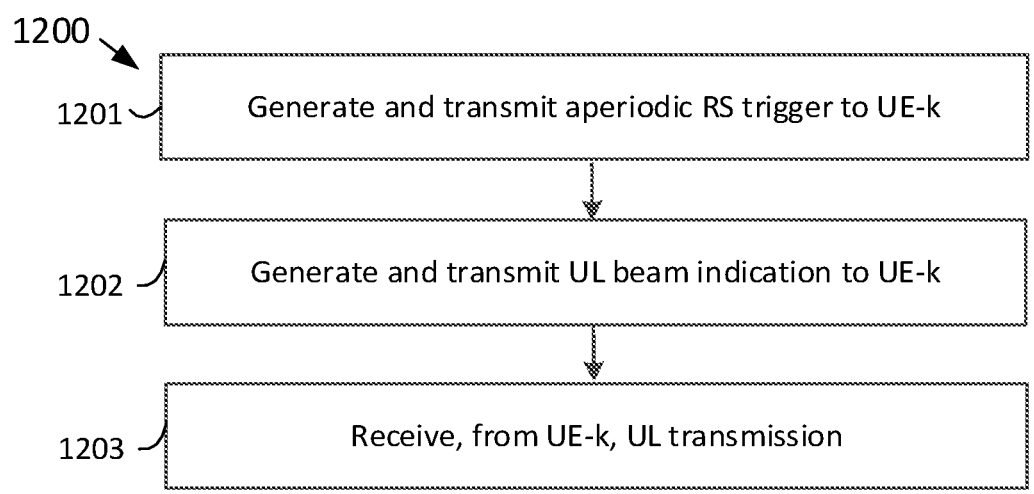
FIG. 12 illustrates a flowchart for an example method wherein a BS generates and transmits UL beam indication according to one or more embodiments of the present disclosure.

FIG. 12 illustrates a flowchart for an example method 1200 wherein a BS generates and transmit UL beam indication for a UE (labeled as UE-k) according to an embodiment of the present disclosure. For example, the method 1200 can be performed by the BS 102. The embodiment of the method 1200 shown in FIG. 12 is for illustration only.

The method 1200 begins with the BS generating and transmitting aperiodic RS trigger to UE-k (step 1201). At a later time-instant, the BS generates and transmits UL beam indication to UE-k (step 1202). The UL beam indication includes a state of a transmit configuration associated with a transmit spatial filter of the reference RS. The reference RS is at least a Channel State Information RS (CSI-RS) or a Sounding RS (SRS). The UL beam indication can be included in an UL grant received on a Physical Downlink Control Channel (PDCCH). For instance, the UL beam indication can be signaled in an UL Transmit Configuration Information (TCI) field of an UL-related DCI. Subsequently, the BS receives UL transmission from UE-k (step 1203) on, for instance, a physical uplink shared channel (PUSCH) or a physical uplink control channel (PUCCH).

The triggered aperiodic RS can be a CSI-RS. In this case, between steps 1201 and 1202, the BS transmits the aperiodic CSI-RS and receives a beam metric report. Optionally, the triggered aperiodic RS is an SRS. In this case, between steps 1201 and 1202, the BS receives the aperiodic SRS which is transmitted by UE-k in response to the trigger.

Although FIGS. 11 and 12 illustrate examples of methods for receiving configuration information and configuring a UE, respectively, various changes can be made to FIGS. 11 and 12. For example, while shown as a series of steps, various steps in each figure can overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE) comprising:
    a transceiver configured to receive, from a base station, an aperiodic reference signal (RS) trigger and, at a later time instant, an uplink (UL) beam indication; and
    a processor operably connected to the transceiver, the processor configured to:
        decode the aperiodic RS trigger;
        decode the UL beam indication; and
        determine, from the UL beam indication, a transmit spatial filter applied to a signal to be transmitted on a physical uplink shared channel (PUSCH) or a physical uplink control channel (PUCCH),
    wherein the transceiver is further configured to transmit, to the base station, the signal on the PUSCH or the PUCCH,
    wherein the transmit spatial filter corresponds to a reference RS, and
    wherein the UL beam indication includes a state of a transmit configuration associated with the reference RS.

2. The UE of claim 1, wherein the reference RS is at least a channel state information RS (CSI-RS) or a sounding RS (SRS).

3. The UE of claim 1, wherein the UL beam indication is included in an UL grant received on a physical downlink control channel (PDCCH).

4. The UE of claim 1, wherein an aperiodic RS corresponding to the aperiodic RS trigger is a aperiodic channel state information RS (CSI-RS).

5. The UE of claim 4, wherein the transceiver is further configured to receive the aperiodic CSI-RS in response to the aperiodic RS trigger and transmit a beam metric report.

6. The UE of claim 1, wherein an aperiodic RS corresponding to the aperiodic RS trigger is an aperiodic sounding RS (SRS).

7. The UE of claim 6, wherein the transceiver is further configured to transmit the aperiodic SRS in response to the aperiodic RS trigger.

8. A base station (BS) comprising:
    a processor configured to generate an aperiodic reference signal (RS) trigger and an uplink (UL) beam indication; and
    a transceiver operably connected to the processor, the transceiver configured to:
        transmit, to a user equipment (UE), the aperiodic RS trigger and, at a later time instant, the UL beam indication; and
        receive, from the UE, a signal on a physical uplink shared channel (PUSCH) or a physical uplink control channel (PUCCH),
    wherein the UL beam indication includes a state of a transmit configuration associated with a transmit spatial filter that corresponds to a reference RS.

9. The BS of claim 8, wherein the reference RS is at least a channel state information RS (CSI-RS) or a sounding RS (SRS).

10. The BS of claim 8, wherein an aperiodic RS corresponding to the aperiodic RS trigger is a aperiodic channel state information RS (CSI-RS).

11. The BS of claim 10, wherein the transceiver is further configured to transmit the aperiodic CSI-RS and receive a beam metric report.

12. The BS of claim 8, wherein an triggered aperiodic RS corresponding to the aperiodic RS trigger is an aperiodic sounding RS (SRS).

13. The BS of claim 12, wherein the transceiver is further configured to receive the aperiodic SRS.

14. A method for operating a user equipment (UE), the method comprising:
    receiving, from a base station, an aperiodic reference signal (RS) trigger and, at a later time instant, an uplink (UL) beam indication;
    decoding the aperiodic RS trigger;
    decoding the UL beam indication;
    determining, from the UL beam indication, a transmit spatial filter applied to a signal to be transmitted on a physical uplink shared channel (PUSCH) or a physical uplink control channel (PUCCH); and
    transmitting, to the base station, the signal on the PUSCH or the PUCCH,
    wherein the transmit spatial filter corresponds to a reference RS, and
    wherein the UL beam indication includes a state of a transmit configuration associated with the reference RS.

15. The method of claim 14, wherein the reference RS is at least a channel state information RS (CSI-RS) or a sounding RS (SRS).

16. The method of claim 14, wherein the UL beam indication is included in an UL grant received on a physical downlink control channel (PDCCH).

17. The method of claim 14, wherein an aperiodic RS corresponding to the aperiodic RS trigger is a aperiodic channel state information RS (CSI-RS).

18. The method of claim 17, further comprising:
    receiving the aperiodic CSI-RS in response to the aperiodic RS trigger; and
    transmitting a beam metric report.

19. The method of claim 14, wherein an aperiodic RS corresponding to the aperiodic RS trigger is an aperiodic sounding RS (SRS).

20. The method of claim 19, further comprising transmitting the aperiodic SRS in response to the aperiodic RS trigger.

* * * * *